United States Patent Office 3,433,655
Patented Mar. 18, 1969

3,433,655
SEALER AND METHOD OF SEALING LIQUID
SYSTEMS
Arthur Nugent, Chicago, Ill., assignor of one-half to
Edison Muse, Jr., Chicago, Ill.
No Drawing. Filed Apr. 27, 1966, Ser. No. 545,581
U.S. Cl. 106—33                                    4 Claims
Int. Cl. C09k 3/12

ABSTRACT OF THE DISCLOSURE

A sealer and method of sealing a liquid system wherein a sealer mixture of ground red cayenne pepper, white pepper and/or paprika in a liquid including water, alcohol or ethylene glycol is circulated through the liquid system for 5 to 20 minutes while maintaining the system liquid between 120° F. and 200° F.

BACKGROUND OF THE INVENTION

This invention relates generally to sealers for liquid systems and more particularly to preparations and methods for sealing leaks in automotive water cooling systems.

A serious problem of long standing in the automotive industry has been the great difficulty in repairing leaks which frequently occur in water systems provided for cooling automotive engines. Such leaks may result from a variety of causes, such as, corrosion of the radiator coils, a shock or impact to the radiator, and freezing of the water within the jacket surrounding the engine causing what is commonly known as a cracked block. In any event, such leaks must be completely closed in order to avoid replacement of an expetnsive part or total disability of the vehicle.

Although numerous means of both an external and internal nature have heretofore been provided for repairing such leaks, these attempts to cope with the problem have been, at best, only partially successful. Thus, for example, external methods such as welding and soldering have been tried. Not only are these external methods relatively expensive, but they also require highly skilled personnel and drainage of the water system. In addition, they frequently resulted in a temporary or imperfect seal, particularly where the largest portion of the crack or hole was internal.

Among internally acting remedies, there have been provided a great variety of preparations known as liquid solders. These preparations were poured into the automobile radiator with the avowed purpose of automatically sealing an existing leak. However, as anyone versed in the art can readily attest, all of these internal remedies have been for the most part quite ineffective.

It is therefore an important object of this invention to provide a sealer for liquid systems which overcomes all of the problems mentioned hereinabove. A related object is to provide a method of sealing leaks in liquid systems which overcomes all of the problems mentioned hereinabove.

Other object is to afford a sealer of the character described which results in a perfect and permanent seal.

A further object is to provide a sealer of the character described which is very simple to use and does not require skilled persons or drainage of the water system. In this regard, the invention comprises a preparation which is simply inserted into the water system and then functions automatically.

Still another object is to afford a sealer of the character described which performs its sealing function in a matter of minutes so that lengthy disabling of the vehicle is not required.

Yet another object is to provide a sealer of the character described which may be inexpensively produced and yet is most efficient for the purposes intended.

With these and other objects in view which may appear as the description proceeds, the invention accordingly consists of the new sealer formulations hereinafter fully described and discussed and from a consideration of which should result an understanding of the invention and an appreciation of the many advantages inherent therein.

SUMMARY OF THE INVENTION

In a general sense, the invention may be said to comprise a ground condiment pepper in mixture with a suitable carrier liquid.

DESCRIPTION OF THE PREFERRED EMBODIMENTS

I have discovered that certain ground vegetable products, commonly used as different forms of the condiment pepper, function most remarkably to effectively and permanently seal leaks in pressurized water systems such as those found in automobiles. Of the various forms of pepper known, the ones which I have found to be most effective are red cayenne pepper, paprika and white pepper.

The different ground peppers may be used individually, or in mixture, in any desired proportions, with one or more of the others. In any case, the ground pepper is first mixed with a suitable carrier liquid, and for this purpose I have found any one of the following liquids to be ideal—water, methyl alcohol, ethyl alcohol, propyl alcohol and ethylene glycol.

Specific formulations of the invention which have been successfully used are:

EXAMPLE 1

|   | Ounces |
|---|---|
| Ground red cayenne pepper | 2½ |
| Ethyl alcohol | 10 |

EXAMPLE 2

| | |
|---|---|
| Ground paprika | 2½ |
| Water | 10 |

EXAMPLE 3

| | |
|---|---|
| Ground white pepper | 2½ |
| Ethylene glycol | 10 |

EXAMPLE 4

| | |
|---|---|
| Ground red cayenne pepper | 1½ |
| Ground paprika | ½ |
| Ground white pepper | ½ |
| Propyl alcohol | 10 |

To practice my novel method, I first heat up the liquid in the automotive system by letting the engine run until normal operating temperature is reached. A solution containing the ground pepper product, such as one of the examples above, is poured into the radiator. The radiator is then closed and the engine run for a period of about 5 to 20 minutes longer, or until there is no more leakage. At the end of this period, the previously existing leak has been automatically and permanently sealed in watertight relationship.

The exact manner in which the invention functions as described is not fully understood. Nonetheless, each practice of the invention has resulted in a total and permanent sealing of the particular leak involved.

From the foregoing description, it should be apparent that I have invented a new sealer and method of sealing leaks in liquid systems. The solutions may be inexpensively manufactured and are most simple to use. After a period of only minutes, there is automatically created a permanent seal.

It should of course be appreciated that the foregoing examples have been described merely for illustrative purposes and that the exact proportions of ingredients are capable of wide variation within the purview of the invention as defined in the appended claims.

What I claim and desire to secure by Letters Patent of the United States is:

1. A method of sealing leaks in a liquid system comprising the steps of:

heating the liquid in said system to a temperature of between 120° F. and 200° F., circulating in said system a mixture comprising a ground pepper product selected from the group consisting of paprika, white pepper and mixtures thereof and a liquid selected from the group consisting of water, methyl alcohol, ethyl alcohol, propyl alcohol and ethylene glycol, and maintaining the heated temperature of the system liquid while circulating the system liquid and mixture through said system.

2. The method of claim 1 wherein said system liquid and mixture are circulated for a period of between 5 and 20 minutes.

3. A method of sealing leaks in a liquid system comprising the steps of:

heating the liquid in said system to a temperature of between 120° F. and 200° F., circulating in said system a sealer consisting of ground red cayenne pepper and a liquid selected from the group consisting of water, methyl alcohol, ethyl alcohol, propyl alcohol and ethylene glycol, and maintaining the heated temperature of the system liquid while circulating the system liquid and mixture through said system.

4. The method of claim 3 wherein said system liquid and mixture are circulated for a period of between 5 and 20 minutes.

References Cited

UNITED STATES PATENTS

| 2,571,948 | 10/1951 | Sair et al. | 99—140 |
| 1,808,637 | 6/1931 | Colberg et al. | 106—33 |
| 2,264,362 | 12/1941 | Clapsadle | 106—33 |
| 2,580,719 | 1/1952 | Barton | 106—33 |

OTHER REFERENCES

Chemical Abstracts, vol. 51, 14, 253b, 1957.
The Chemical Dictionary, sixth ed., 1961, p. 214.

DONALD J. ARNOLD, *Primary Examiner.*

T. MORRIS, *Assistant Examiner.*

U.S. Cl. X.R.

106—287